US010002183B2

(12) United States Patent
Assadollahi et al.

(10) Patent No.: US 10,002,183 B2
(45) Date of Patent: Jun. 19, 2018

(54) RESOURCE EFFICIENT DOCUMENT SEARCH

(71) Applicant: ExB Asset Management GmbH, Munich (DE)

(72) Inventors: Ramin Assadollahi, Munich (DE); Stefan Bordag, Munich (DE)

(73) Assignee: ExB Asset Management GmbH, Munich (DE)

( * ) Notice: Subject to any disclaimer, the term of this patent is extended or adjusted under 35 U.S.C. 154(b) by 1219 days.

(21) Appl. No.: 13/953,663

(22) Filed: Jul. 29, 2013

(65) Prior Publication Data

US 2014/0032567 A1    Jan. 30, 2014

(30) Foreign Application Priority Data

Jul. 30, 2012    (EP) .................................... 12178492

(51) Int. Cl.
G06F 17/30    (2006.01)

(52) U.S. Cl.
CPC .... *G06F 17/30622* (2013.01); *G06F 17/3069* (2013.01); *G06F 17/30705* (2013.01); *G06F 17/30864* (2013.01)

(58) Field of Classification Search
CPC ........... G06F 17/30622; G06F 17/3069; G06F 17/30705
See application file for complete search history.

(56) References Cited

U.S. PATENT DOCUMENTS

| 2012/0158731 A1* | 6/2012 | Gherman | .......... | G06F 17/30705 |
| | | | | 707/741 |
| 2012/0209847 A1* | 8/2012 | Rangan | ............... | G06F 17/3069 |
| | | | | 707/737 |
| 2013/0151533 A1* | 6/2013 | Udupa | .............. | G06F 17/30646 |
| | | | | 707/742 |

OTHER PUBLICATIONS

Navarro, Gonzalo et al. "Modern Information Retrieval, Chapter 8: Indexing and Searching", Jan. 1, 1999, Modern Information Retrieval, ACM press, New York, pp. 191-228, XP002457291, ISBN:978-0-201-39829-8.
FrescoBot: "Inverted Index", Wikipedia, the free encyclopedia, May 30, 2012, XP002696358, retrieved from the internet on Apr. 30, 2013; URL:http://en.wikipedia.org/w/index.php?title=Inverted_index&oldid=495181194.
European Search Report for EP Application No. 12178492.0, dated May 17, 2013.

* cited by examiner

*Primary Examiner* — Alicia Willoughby
(74) *Attorney, Agent, or Firm* — Polsinelli PC (57) ABSTRACT

The present document relates to a system and method for searching a document using one or more search terms. In particular, the present document relates to a resource efficient method for searching a document within a database of documents. A method for determining an inverse index on an electronic device including a database is described. The inverse index is configured to map a plurality of text data entities from the database to a search term. The method includes determining a plurality of relevance vectors for a plurality of text data entities from the database. Determining a relevance vector for a text data entity from the database includes: selecting N terms which are descriptive of the text data entity; and determining the relevance vector from the selected N terms. Furthermore, the method includes determining the inverse index comprising a plurality of records.

10 Claims, 5 Drawing Sheets

Fig. 6

RESOURCE EFFICIENT DOCUMENT SEARCH

CROSS-REFERENCE TO RELATED APPLICATION

The present application claims priority to EP 12178492.0 filed on Jul. 30, 2012, the entire contents of which are hereby incorporated by reference.

FIELD

The present document relates to a system and method for searching for documents using one or more search terms, a document or a collection of documents. In particular, the present document relates to a resource efficient method for searching a document within a database of documents

BACKGROUND

Search engines (e.g. internet search engines) allow a user to identify relevant documents, in response to a query comprising e.g. one or more search terms. Search engines typically make use of significant computing resources (with regards to processing power and with regards to memory), in order to provide the user with a reliable list of potentially relevant documents.

Handheld electronic devices (e.g. smartphones, tablet computers, notebook computers, etc.) allow a user to carry around a large database of text documents (such as electronic books, emails, sms, calendar database entries, address book entries, downloaded webpages, and others). The user should be enabled to reliably and efficiently determine relevant text documents from the database of text documents, in response to a query. However, handheld electronic devices typically have very limited computing resources (with respect to memory and processing power). It is therefore desirable to provide a method and a system for determining a list of (relevant) candidate documents, in response to a query comprising one or more search terms, in a resource efficient manner. The query comprising one or more search terms may be derived from (e.g. may correspond to) a document (referred to e.g. as a search document).

SUMMARY

According to an aspect, a method for determining an inverse index on an electronic device comprising a database is described. The inverse index may be stored on the electronic device and the inverse index may be configured to map a plurality of text data entities from the database to a search term. In other words, the inverse index may comprise (or may be indicative of) a list of search terms. Each search term may be associated with a record of text data entities which comprise the search term that the record is associated with and/or which are relevant for the search term that the record is associated with. Examples for a text data entity are a text document, an email, a sms, a calendar entry, and/or an address book entry.

The method may comprise determining a plurality of relevance vectors for a plurality of text data entities from the database. Each of the text data entities of the database may be associated with a corresponding relevance vector. The relevance vector may be stored as metadata of the corresponding text data entity. The relevance vector may be indicative of the N most relevant terms (e.g. words) within the corresponding text data entity. Alternatively or in addition, the relevance vector may be indicative of the N most descriptive terms (e.g. words) about the corresponding text data entity. It should be noted that in the present document, the expressions "term" or "word" are understood in the sense of a "term type" or a "word type".

Determining a relevance vector for a text data entity from the database may comprise some or all of the following steps. In particular, each of the plurality of relevance vectors may be determined using some or all of the following steps. A relevance vector may be determined by selecting N terms which are descriptive of the text data entity. By way of example, the most descriptive terms and/or the terms having the highest relevance within the text data entity may be selected. The relevance vector may be determined from the selected N terms.

In a preferred embodiment, in order to determine a relevance vector for a text data entity, a plurality of occurrence rates (also referred to as absolute frequencies) of a plurality of terms within the text data entity may be determined. By way of example, for each term of a text data entity a respective occurrence rate (relative to the total number of terms within the text data entity) may be determined. Furthermore, a plurality of relevance values for the plurality of terms may be determined, based on the plurality of occurrence rates and based on a plurality of default occurrence rates for the plurality of terms. The default occurrence rates may be taken from a pre-determined list of default occurrence rates. The pre-determined list of default occurrence rates may have been determined using a corpus of training text data entities. By way of example, the plurality of relevance values may be determined by considering a deviation of the plurality of occurrence rates from the plurality of default occurrence rates, respectively. The deviation may be determined based on the ratio or the difference of the occurrence rates, and/or may be determined using a statistical significance measure (e.g. a chi-square measure, a log-likelihood measure, etc.).

The relevance vector for the text data entity may be determined by selecting the N terms from the plurality of terms having the highest relevance values. In particular, the relevance vector may be determined from the selected N terms and the respective relevance values. Even more particularly, the relevance vector may be determined from the selected N terms and the respective relevance values only, without considering the other terms having lower relevance values. N may be an integer smaller than or equal to 20 or 15 or 10 or may be a function depending on a given parameter such as the total document collection size (i.e. such as a number of text data entities comprised within the database). By way of example, N may decrease as the number of text data entities comprised within the database decreases and vice versa.

The method may further comprise determining the inverse index comprising a plurality of records. Each of the plurality of records may be associated with a respective term from the terms indicated within the plurality of relevance vectors. In particular, each record may be indicative of a plurality of text data entities from the database, wherein the plurality of text data entities is relevant for the term that the record is associated with. Determining the inverse index may comprise, for each of the plurality of records, selecting up to P text data entities from the database. The relevance vectors of the up to P selected text data entities of the record may be associated with (e.g. may be indicative of or may comprise) the term that the record is associated with. In particular, the up to P selected text data entities of the record may be relevant for the term that the record is associated with. P may be an integer set to a default small value such as 5 (e.g. P may be equal to or smaller than 5). Each of the plurality of data records may be indicative of only up to (e.g. of exactly) P text data entities (and not of more than P text data entities).

Each of the plurality of records may be further indicative of the relevance values of each of the up to P text data entities for the term that the record (222, 522) is associated with. The relevance value of a text data entity within a record may correspond to the relevance value of the term that the record is associated with within the relevance vector of the text data entity.

A first record for a first term may comprise the up to P text data entities for which the corresponding relevance vectors indicate the highest relevance values for the first term among all of the plurality of relevance vectors. In other words, the up to P text data entities that are indicated within a record may be the up to P text data entities having the highest relevance values for the term that the record is associated with (among the plurality of text data entities of the database).

Typically, the relevance vectors of the up to P text data entities of each of the plurality of records comprise the term that the respective record is associated with. In other words, a record for a term typically only comprises (or is indicative of) text data entities which have relevance vectors which comprise the term that the record is associated with.

The method may be adapted for semantic text processing. For this purpose, the method may comprise mapping the terms of each of the plurality of relevance vectors to corresponding clusters, using a term-to-cluster mapping table, thereby yielding a plurality of semantic relevance vectors. The term-to-cluster mapping table typically reflects a generalization of generally distinct topics in the general discourse in the language based on distributional similarity which in turn is based on observations of statistical co-occurrence of terms. In other words, the term-to-cluster mapping table typically reflects groups of terms which are used within corresponding distinct semantic topics and which may be determined based on distributional similarity, i.e. which is based on the observation of a statistical co-occurrence of terms. The term-to-cluster mapping table may be pre-determined, e.g. based on a corpus of training text data entities. Each of the plurality of records of the inverse index may be associated with a respective cluster from the clusters indicated within the plurality of semantic relevance vectors. In such cases, the inverse index may be referred to as a semantic inverse index. The semantic relevance vectors of the up to P text data entities of each of the plurality of records typically comprise the cluster that the record is associated with. In case of a semantic inverse index, the records of the inverse index comprise (or are indicative of) of up to P text data entities which are relevant for the respective clusters that the records are associated with.

According to a further aspect, an inverse index for storage on an electronic device comprising a database is described. The inverse index may be configured to map one or more text data entities from the database to one or more search terms. The inverse index may comprise a plurality of records. Each of the plurality of records may be associated with a respective term from terms indicated within a plurality of relevance vectors for a respective plurality of text data entities of the database. A relevance vector for a text data entity may be indicative of only up to the N terms from the plurality of terms having the highest relevance values within the text data entity (and/or not for more than N terms). N may be an integer smaller than or equal to some predetermined number such as 20. This number may be made dependent on the total number of text data entities comprised within the database. Each of the plurality of records may be indicative of only up to P text data entities from the database (and/or not for more than P text data entities). The relevance vectors of the up to P text data entities of each of the plurality of records may be associated with (e.g. may comprise or may be indicative of) the term that the record is associated with. P may be an integer smaller than or equal to some predetermined number such as 5. This number may be made dependent on the total number of text data entities comprised within the database. By way of example P and/N may be increased with an increasing number of text data entities comprised within the database and vice versa.

According to a further aspect, an inverse index configured to map one or more text data entities from a database to a search term is described. The inverse index is characterized by the fact that it is determined using any of the methods for determining an inverse index, described in the present document.

According to another aspect, a method for determining on an electronic device comprising a database a similar text data entity from the database is described. The similar text data entity is similar to a search vector comprising a plurality of search terms. The search vector may be one or more of: a query comprising the plurality of search terms; and a relevance vector of a text data entity, wherein the plurality of search terms corresponds to the N most relevant terms within the text data entity.

The method may comprise determining a plurality of first candidate text data entities based on a first of the plurality of search terms without considering the others of the plurality of search terms, using an inverse index. The inverse index may be configured as described in the present document. As such, the plurality of first candidate text data entities may be determined based on an individual search term from the search vector (without considering the other search terms). In view of the streamlined inverse index described in the present document, the plurality of first candidate text data entities comprises only a very limited number of text data entities (typically up to P text data entities), for which the first search term has a high relevance.

The method may further comprise determining a degree of similarity between each of the plurality of first candidate text data entities and the search vector. When determining the degree of similarity at least one of the plurality of search terms other than the first search term (e.g. all of the plurality of search terms) may be taken into account. The similar candidate text data entity may then be determined based on the plurality of first candidate text data entities and based on the respective degrees of similarity. By way of example, the similar candidate text data entity may be determined as the candidate text data entity having the highest degree of similarity.

As such, the method for determining the similar candidate text data entity may comprise a first phase where candidate text data entities are determined based on the individual search terms from the search vector. In a second phase, a degree of similarity between the candidate text data entities and the complete search vector may be determined (e.g. using a cosine similarity), thereby yielding the similar candidate text data entity.

The method may further comprise determining a plurality of candidate text data entities for each of the plurality of search terms, respectively. Furthermore, the method may comprise, for each of the plurality of search terms, determining a degree of similarity between each of the respective plurality of candidate text data entities and the search vector. In addition, the method may comprise determining the similar candidate text data entity based on the plurality of candidate text data entities for each of the plurality of search terms and the respective degrees of similarity. By way of example, the similar candidate text data entity may be determined as the candidate text data entity having the highest degree of similarity among all of the candidate text data entities which have been identified based on the individual search terms.

The method for determining the similar candidate text data entity may be performed in an iterative and/or parallelized manner, thereby allowing the provision of early search results, and the subsequent adjustment of the search results. In such an iterative method, the plurality of candidate text data entities, the respective degrees of similarity and/or the similar candidate text data entity may be determined iteratively starting with the first individual search term and one-by-one progressing with the other individual search terms of the plurality of search terms, until the plurality of candidate text data entities has been determined for each of the plurality of search terms.

The method may be adapted to perform a semantic search. For this purpose, the method may comprise mapping the search terms of the plurality of search terms to corresponding clusters, using a term-to-cluster mapping table, thereby yielding a semantic search vector comprising a plurality of search cluster. As indicated above, the term-to-cluster mapping table may reflect a statistical co-occurrence of terms within training text data entities of a corpus. The plurality of first candidate text data entities may be determined based on a first of the plurality of search clusters individually, without considering the others of the plurality of search clusters. On the other hand, a degree of similarity between each of the plurality of first candidate text data entities and the semantic search vector may be determined by taking into account at least one of the plurality of search clusters other than the first search cluster (e.g. by taking into account the complete semantic search vector).

According to another aspect, an electronic device comprising a database which comprises a plurality of text data entities is described. The electronic device may be configured to determine a plurality of relevance vectors for the plurality of text data entities from the database. As already outlined above, the determining of a relevance vector for a text data entity from the database may comprise one or more of the following steps: determining a plurality of occurrence rates of a plurality of terms within the text data entity; determining a plurality of relevance values for the plurality of terms, based on the plurality of occurrence rates and based on a plurality of default occurrence rates for the plurality of terms; selecting the N terms from the plurality of terms having the highest relevance values; and/or determining the relevance vector from the selected N terms and the respective relevance values. Furthermore, the electronic device may be configured to determine an inverse index comprising a plurality of records. Each of the plurality of records may be associated with a respective term from the terms indicated within the plurality of relevance vectors. As indicated above, determining the inverse index may comprise, for each of the plurality of records, selecting up to P text data entities from the database. The relevance vectors of the up to P text data entities of the record may be associated with (e.g. may comprise or may be indicative of) the term that the record is associated with.

Furthermore, the electronic device may be configured to determine a similar candidate text data entity. For this purpose, the electronic device may be configured to determine a plurality of first candidate text data entities based on a first of a plurality of search terms without considering the others of the plurality of search terms, using the inverse index. Furthermore, the electronic device may be configured to determine a degree of similarity between each of the plurality of first candidate text data entities and a search vector comprising the plurality of search terms, by taking into account at least one of the plurality of search terms other than the first search term. In addition, the electronic device may be configured to determine a similar candidate text data entity based on the plurality of first candidate text data entities and based on the respective degrees of similarity.

According to a further aspect, a software program is described. The software program may be stored on a computer-readable medium (which may be tangible or otherwise non-transitory) as instructions that are adapted for execution on a processor and for performing the aspects and features outlined in the present to document when carried out on a computing device.

According to another aspect, a storage medium comprising a software program is described. The storage medium may be memory (e.g. RAM, ROM, etc.), optical media, magnetic media and the like. The software program may be adapted for execution on a processor and for performing the aspects and features outlined in the present document when carried out on a computing device.

According to a further aspect, a computer program product is described. The computer program product may comprise executable instructions for performing the aspects and features outlined in the present document when executed on a computing device.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

BRIEF DESCRIPTION OF THE DRAWINGS

The invention is explained below in an exemplary manner with reference to the accompanying drawings, wherein.

DETAILED DESCRIPTION

Figure 1:
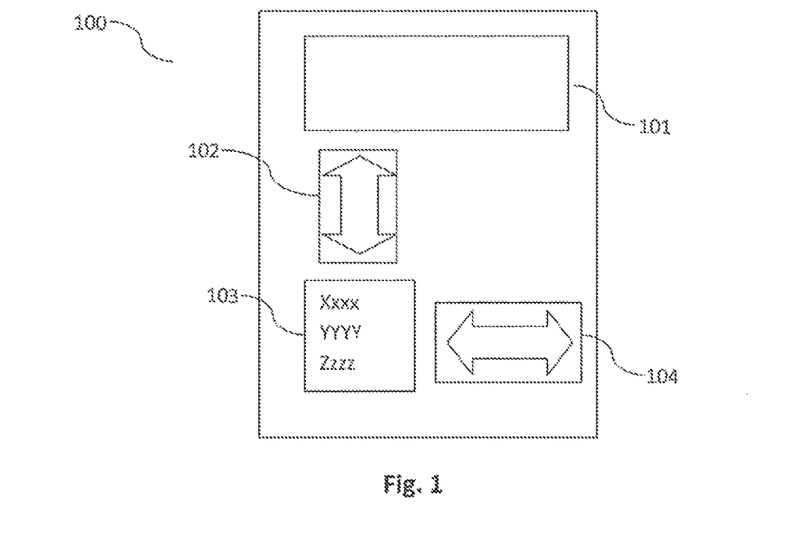
FIG. 1 illustrates a block diagram of an example electronic device.

FIG. 1 shows an example electronic device 100 which may be configured to perform the search schemes described in the present document. The electronic device 100 may be a portable and/or wireless electronic device, e.g. a smartphone, a tablet PC or a laptop PC. The electronic device 100 comprises a database 103 for storing and managing a plurality of text data entities (or textual data entities or data entities). Typical examples of text data entities are email messages, sms messages, text documents, address book entries, calendar entries, web pages, etc. The database 103 may store the plurality of data entities using an organizational structure (e.g. a folder structure). Furthermore, the database 103 may comprise a representational structure or metadata regarding the plurality of data entities. Such metadata may e.g. comprise a relevance vector described in the present document. In particular, a data entity of the database 103 may be associated with a relevance vector of relevant terms comprised within the data entity. Furthermore, the database 103 may comprise an inverse index of search terms for the plurality of data entities stored within the database 103.

The electronic device 100 may further comprise a data input/output unit 104. On a physical layer, the data input/output unit 104 may comprise a wireless or wireline communication interface in order to exchange data entities with another electronic device or a network (sharing) server. On a logical layer, the data input/output unit 104 may be configured to manage the receipt and storage of data entities on the electronic device 100, as well as the sending of data entities from the electronic device 100.

Furthermore, the electronic device 100 may comprise a data generation environment 101 which a user of the electronic device 100 can use to generate a new data entity, e.g. a new email message or a new text document, and/or to generate a query comprising one or more search terms. The data generation environment 101 typically comprises a display for displaying the new data entity or query, and editing means, e.g. a keyboard, for composing the new data entity or query, and/or a text-to-speech voice module to present the new data entity or query to the user in an audible format, and voice editing means via a speech-to-text module for composing the new data entity or query. In addition, the electronic device 100 comprises a search engine 102 which identifies data entities from the database 103, which have a high degree of relevance for the new data entity or the query which is being generated in the data generation environment 101. In order to determine the relevance of a data entity stored in the database 103 for the generation of the new data entity or for the query, the search engine 102 may make use of the search schemes described in the present document.

The electronic device 100 may be configured to determine a list of relevant data entities (also referred to herein as candidate data entities) from the database 103, while a user of the electronic device 100 is editing a new data entity (e.g. while the use of the electronic device 100 is writing an email). As such, the user will be able to use parts of the relevant data entities (e.g. in a "paste and copy" operation) for the generation of the new data entity. In order to determine the list of relevant data entities, the electronic device 100 may be configured to extract a relevance vector for the new data entity. The relevance vector may be determined using the methods described in the present document. The relevance vector may comprise the N most relevant terms (or words) of the new data entity. In order to provide a resource efficient search scheme, the number N of terms within the relevance vector of a data entity is selected to be relatively low, e.g. N may be smaller than or equal to 5, 10, 15, 20.

As such, the electronic device 100 may determine a relevance vector comprising N relevant terms for the new data entity. The relevance vector may be updated as the new data entity is generated by the user, thereby also updating the list of relevant data entities proposed to the user. The relevance vector of the new data entity may be viewed as a query comprising N search terms (and possibly respective relevance values). In the following, reference is made in general to a query comprising a certain number M of search terms. The query may correspond to the relevance vector of the new data entity which is being generated (in such cases M may be equal to N). On the other hand, the query may also refer to any kind of query comprising search terms entered by the user. Overall, a query may be considered to comprise a plurality of M search terms. Furthermore, the query may comprise M relevance values for the M search terms. The relevance values indicate the relative importance of the respective search terms within the query. If the query corresponds to the relevance vector of a text data entity, the relevance values indicate the relative importance of the terms of the relevance vector within the text data entity.

Figure 2A:
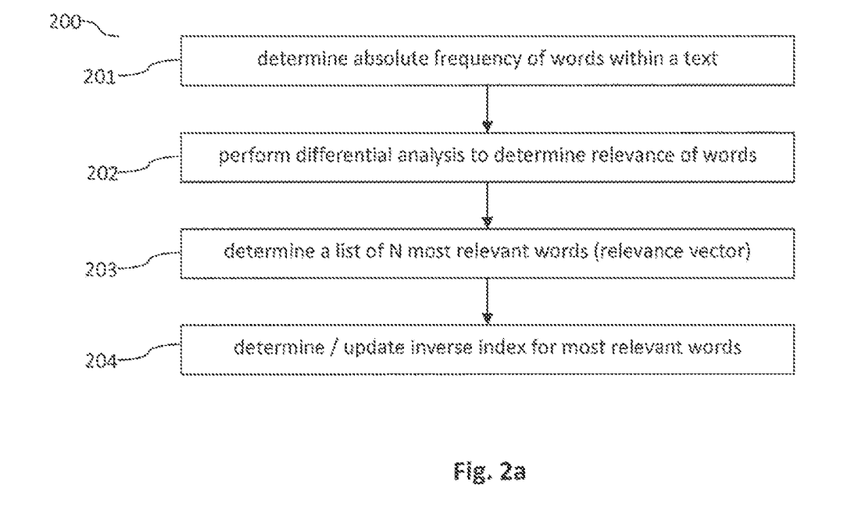
FIGS. 2a to 2c illustrate an example method for determining an inverse index.

As indicated above, some or all of the data entities comprised within the database 103 may be associated with a respective relevance vector of the data entity. The relevance vector may indicate the N most relevant terms (or words) comprised within the data entity. FIG. 2a illustrates a flow chart of an example method 200 for determining the relevance vector of a data entity, and for generating/updating an inverse index which allows identifying one or more data entities which are relevant for a particular search term.

The method 200 comprises the step 201 of determining the absolute frequency of the terms comprised within a particular data entity. Subsequently, differential analysis may be used in order to determine the relevance of the terms comprised within the particular data entity (step 202). The relevance vector of the particular data entity typically comprises the N most relevant terms comprised within the particular data entity (step 203). As indicated above, N is kept relatively small (for resource efficiency).

Figure 2B:
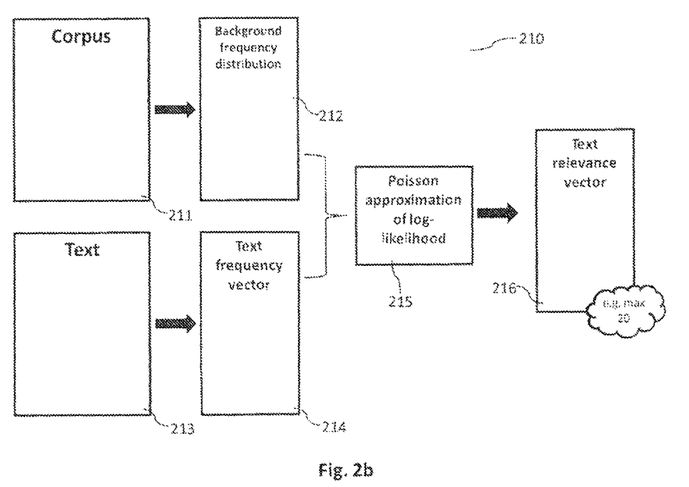

The determination of the relevance vector 216 for a particular data entity 213 is illustrated in further detail in FIG. 2b. A frequency vector 214 may be determined for the data entity 213, wherein the frequency vector 214 may comprise e.g. the absolute frequencies of the X most frequently used terms within the data entity 213 (e.g. X=up to 100 or 500). The frequency vector 214 is compared to a default frequency distribution 212 (also referred to as default occurrence rates) which indicates the typical (e.g. average) frequency of a term within a data entity 213. The default frequency distribution 212 may have been determined offline (e.g. on a central server) based on a corpus 211 of training data entities. The corpus 211 may comprise thousands or even millions of data entities, thereby providing a reliable default frequency distribution 212. The default frequency distribution 212 may comprise e.g. the default frequency of up to one hundred thousand words.

The default frequency distribution 212 and the frequency vector 214 are used to determine the relevance of the terms comprised within the frequency vector 214 for the data entity 213. A term of the frequency vector 214 may be relevant if its absolute frequency within the data entity 213 (reflected within the frequency vector 214) is higher than what would be the expectation for its frequency based on its default frequency (reflected within the default frequency distribution 212). The relevance of a term increases with increasing deviation of the absolute frequency from the default frequency (and vice versa). The relevance values of the terms of the frequency vector 214 may be determined within a relevance determination unit 215 based on a Poisson approximation of log-likelihood (as outlined e.g. in H. F. Witschel, "Terminologie-Extraktion", Ergon, 2004, which is incorporated by reference). The relevance vector 216 of the data entity 213 may be determined by selecting the N terms of the frequency vector 214, which have the highest relevance values.

In other words, a differential analysis may be performed, wherein the differential analysis is based on computing the expected amount of occurrences of a term (or word) in a data entity 213 (e.g. within a document) based on its frequency in a background corpus 211 with the actual amount of occurrences in the data entity 213. The Chi-square, mutual information or log-likelihood may be used for this purpose. One variant is called tf.idf which means term-frequency-inverse-document-frequency. In the illustrated example, the Poisson distribution approximation of the log-likelihood is used.

The method 200 may comprise the step 204 of determining and/or updating an inverse index for the L most relevant terms. The inverse index comprises L records for the L most relevant terms, respectively. A particular record for a particular term may be indicative of a list of up to P data entities 213 of the database 103, wherein the particular term has a relatively high relevance within the data entities 213 which are identified by the particular record. Notably, the particular record for the particular term may indicate the data entities 213 within which the particular term has the highest relevance among all the data entities 213 of the database 103. The particular record for the particular term may also be indicative of the relevance (e.g. the relevance value) of the particular term within each of the up to P data entities 213.

The number L of records comprised within the inverse index may be e.g. in the range of hundred thousand or less. The number P of data entities referred to by a record may be relatively small, thereby providing a resource efficient search scheme. By way of example, P is equal to or smaller than 4, 5, 6, 10, or another number and may be made dependent on other measurable parameters such as the total document collection size (i.e. such as the number of text data entities comprised within the database).

Figure 2C:
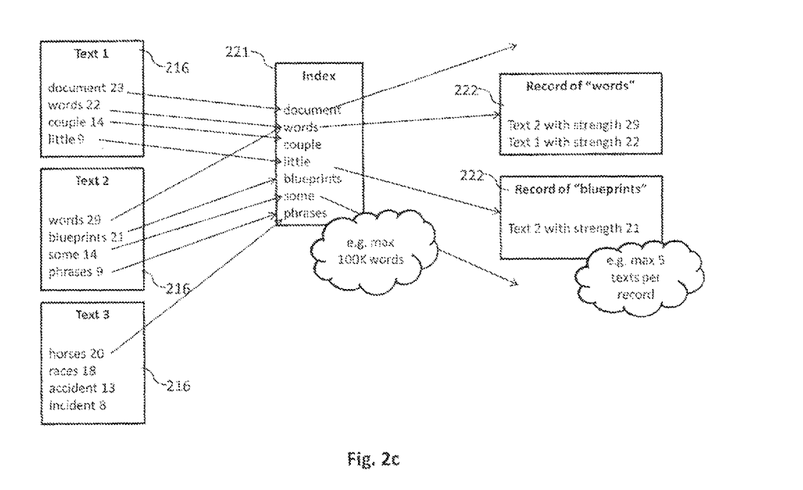

The determination of an inverse index 221 is further illustrated in FIG. 2c. The plurality of relevance vectors 216 for the plurality of data entities 213 of the database 103 are analyzed to determine a complete list of terms comprised within the plurality of relevance vectors 216. As indicated above, a relevance vector 216 comprises (or is indicative of) a limited number of N terms. Due to overlap of the terms of different relevant vectors 216, the complete list of terms typically comprises only in the range of 2000 to 5000 terms (even for a large number of 1000 or more data entities 213 comprised within the database 103). This means that the inverse index 221 typically only comprises L=2000 to L=5000 or less records 222.

A record 222 of the inverse index 221 provides a mapping between a term from the plurality of relevance vectors 216 and a list (or record) of up to P data entities 213. The P data entities 213 may be the data entities 213 for which the term of the record 222 has the highest relevance, compared to all the data entities 213 comprised within the database 103. The record 222 may further provide the relevance (or strength) of the term within each of the P data entities 213.

The inverse index may be updated, as data entities 213 are added or removed from the database 103. If a data entity 213 is removed from the database 103, all references to the removed data entity 213 within the records 222 of the inverse index 221 may be removed. Furthermore, a term of the inverse index 221 having an empty record 222 may be removed from the inverse index 221. In addition, the relevance vector 216 of the removed data entity 213 may be removed. On the other hand, if a data entity 213 is added to the database 103, a relevance vector 216 may be determined for the added data entity 213 (e.g. using method 200). The records 222 for the terms comprised within (or indicated by) the relevance vector 216 of the added data entity 213 are analyzed, in order to determine whether any of the relevant terms of the added data entity 213 have a relevance value which exceeds the lowest relevance indicated in the respective records 222 (or whether a respective record 222 does not indicate P data entities yet). As a result, the added data entity 213 may be included into some or all of the records 222 for the terms of its relevance vector 216. At the same time, all the data entities 213 having a lower relevance value with regards to the respective term of the relevance vector of the added data entity 213 may be removed from the respective record 222. Overall, it can be ensured that the inverse index 221 indicates at all times the up to P most relevant data entities 213 for the L terms listed within the inverse index 221.

In other words, the relevance values from the relevance vector 216, which resulted from the differential analysis, may be used directly inversely as an expression on how important the data entity 213 is for a particular term. Hence, if the term "house" was computed to have a deviation of its frequency in a first data entity 213 from the expected value, and if the deviation was twentyfold, the value 20 may be assigned to the term's importance (or relevance) in the data entity 213. In the inverse index 221, it may be assumed that the significance of the data entity 213 for this term corresponds to the term's relevance value (i.e. the value 20). If another data entity 213 comprises the same term with a significance of 30 (i.e. with a relevance value of 30), the another data entity 213 will be ranked higher than the first data entity 213 within the record 222 for the term "house". If P or more data entities 213 with higher significances (or relevance value) for the term "house" are identified, the first data entity 213 is dropped from the record 222 for the term "house".

In summary, it should be noted that by limiting the number N of terms within the relevance vectors 216, by limiting the number L of terms comprised within the inverse index 221 and/or by limiting the number P of data entities 213 per record 222 of the inverse index 221, the storage and processing requirements for enabling the search for relevant data entities 213 may be kept low (as is detailed further below). Furthermore, it can be ensured that a query for M search terms can be performed in a fixed amount of time which depends on the dimension L×P of the inverse index.

Figure 3:
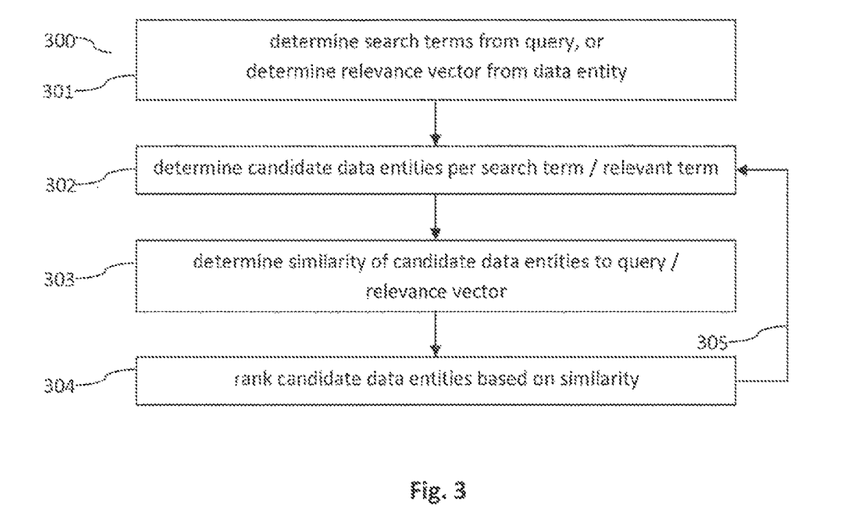
FIG. 3 shows a flow chart of an example method for determining to candidate data entities in response to a query.

FIG. 3 shows a flow chart of an example method 300 for performing a search for relevant data entities 213 subject to a query. The query may comprise M search terms (and possibly respective relevance values). As outlined above, the query may comprise the terms of a relevance vector 216 of a data entity 213, thereby enabling the determination of a degree of similarity between data entities 213. The method 300 comprises the step 301 of identifying the search terms of the query. For each identified search term, candidate data entities are determined (step 302), using the inverse index 221. The candidate data entities for a first search term may correspond to the data entities 213 identified within the record 200 for the first search term (without considering the other search terms from the query).

As such, for a first search term, a corresponding list of first candidate data entities 213 may be determined. The first candidate data entities 213 may be compared to the complete query (step 303). In particular, a similarity measure between the query and each of the first candidate data entities 213 may be determined. For determining the similarity measure between the query and a first candidate data entity 213, the relevance vector 216 of the first candidate entity 213 may be compared to the query (which may be viewed as a relevance vector comprising the plurality of search terms and possibly comprising respective relevance values for the plurality of search terms). By way of example a cosine similarity between a query vector (comprising the search terms) and the relevance vector 216 of the first candidate entity 213 may be determined. As such, for each of the first candidate data entities 213, the degree of similarity to the complete query may be determined. The first candidate data entities 213 may be ranked in accordance to their degrees of similarity (e.g. according to a descending degree of similarity), and some or all of the most similar first candidate data entities 213 may be provided to the user as a search result for the query.

The method 300 may then proceed (step 305) to determine a list of second candidate data entities 213 for the second search term (step 302) (without considering the other search terms of the query), determine the similarity for each of the second candidate data entities 213 to the complete query (step 303), and update the ranking and the output of the candidate data entities 213 (step 304). The ranking is typically performed by taking into account the candidate data entities 213 of the other search terms (i.e. by taking into account the first candidate data entities 213). As such, the ranking is ultimately performed across the candidate data entities 213 for all search terms of the query.

The method 300 proceeds with the steps 302, 303, 304 in an iterative manner for all the search terms comprised within the query. As such, the list of search results (comprising the candidate data entities 213 which are most similar to the complete query) is updated until all of the search terms are processed. This allows to provide a provisional search result in a rapid manner (based on the first candidate data entities 213 of the first search term), wherein the provisional search result is updated (based on the candidate data entities 213 of the other search terms) until a final search results for the complete query is obtained.

The above mentioned iterative method 300 for determining the search results (comprising a list of most similar candidate data entities 213 from the database 103) may alternatively be performed in a block-wise manner (providing the same final search results). When using the block-wise approach, a complete list of candidate data entities 213 is determined by combining the lists of candidate data entities 213 for each of the search terms (by using the union of the lists of candidate data entities 213 for each individual one of the search terms). Subsequently, the degree of similarity between the complete query (comprising all the M search terms) and each of the candidate data entities 213 from the complete list is determined. The candidate data entities 213 from the complete list are then ranked according to their degrees of similarity and the candidate data entities 213 from the complete list having the highest degrees of similarity to the complete query are provided as search results.

The method 300 for providing search results in response to a query works well because it automatically excludes most likely irrelevant documents from being considered for the similarity analysis (in step 303). As such, the method 300 reduces the risk to pick a wrong document, because method 300 only analyzes the similarity to the query for candidate data entities 213 for which at least one search term of the query has a high relevance.

Whereas a conventional search scheme operates directly on a complex inverse index, method 300 uses a streamlined inverse index 221 only to select a list of candidate data entities 213 (based on the individual search terms of the query) which are then compared with the complete query or with the relevance vector 216 of a data entity 213 using a similarity measure such as cosine similarity.

As such, method 300 provides a resource efficient scheme for determining search results (i.e. a list of candidate data entities 213 which are similar to the query), in response to the query. In view of the limited size of the inverse index 221 and the records 222 of the inverse index 221, the search method 300 can be performed with pre-determined memory requirements and within a pre-determined time frame. As such, the search method 300 can be adapted to provide valuable search results on a resource limited device 100, such as a smartphone or a tablet PC.

The data structure of the database 103 and/or the search engine 104, e.g. the relevance vector 216 and/or the inverse index 221, may be adapted to allow for a semantic similarity analysis of a query and a data entity. Semantic analysis takes into account the meaning of a term and tries to take into account the fact that a data entity may comprise terms which are different from the search terms of the query, but which have a similar meaning to the search terms. By way of example, to from a semantic perspective, a search term "house" may be considered to be similar to the term "building". Hence, a search method which takes into account semantic similarity should consider candidate data entities with the relevant term "building", even though the search term is "house".

Figure 4A:
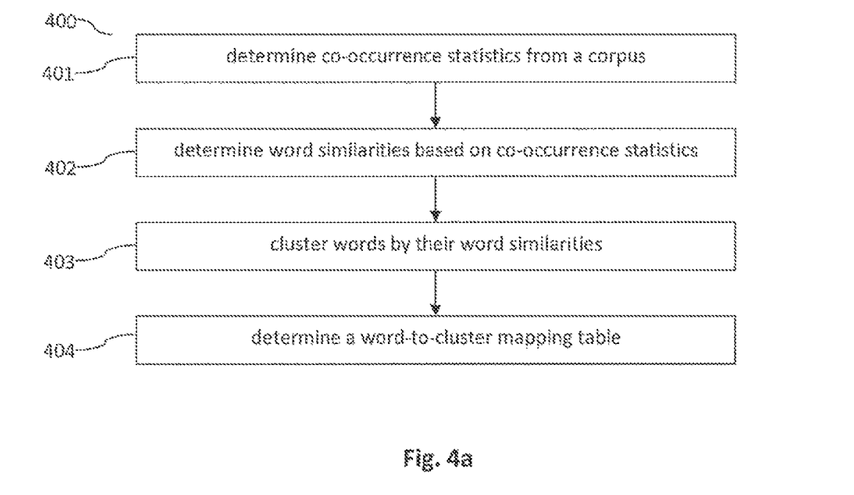
FIGS. 4a to 4b illustrate an example method for determining a plurality of semantic clusters.

FIG. 4a shows a block diagram of a method 400 for determining a term-to-cluster mapping table based on co-occurrence statistics. The term-to-cluster mapping table may be used to implement a search scheme which takes into account semantic similarity. The term-to-cluster mapping table is configured to map terms having similar meaning to the same semantic cluster. By way of example, the terms "house" and "building" may be mapped to the same semantic cluster. The term-to-cluster mapping table may be determined based on a corpus of training data comprising e.g. thousands or millions of data entities. Preferably the corpus 211 of training data is used. Using the corpus, co-occurrence statistics of a plurality of terms may be determined (step 401). The co-occurrence statistics may be used to determine a degree of semantic similarity of a plurality of terms (step 402). Subsequently, the plurality of terms may be clustered based on their degree of semantic similarity (step 403), i.e. terms having a high degree of semantic similarity by be assigned to a cluster. The clusters may be used to determine the term-to-cluster mapping table (step 404). It should be noted that the term-to-cluster mapping table may be determined offline (e.g. on a server) and downloaded onto the electronic device 100.

Figure 4B:
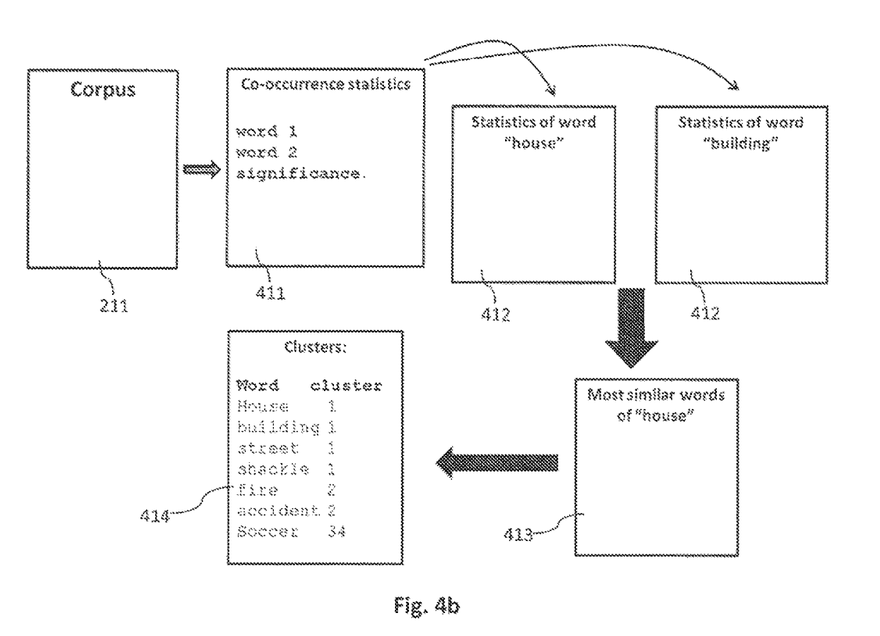

The method 400 for determining the term-to-cluster mapping table 414 is further illustrated in FIG. 4b. Using the corpus 211, co-occurrence statistics 411 may be determined (e.g. for pairs of terms). The co-occurrence statistics 411 may provide an indication for the frequency (or significance) that two terms occur within the same document. The co-occurrence statistics 411 may then be used to determine co-occurrence vectors 412 for each term (e.g. for the terms "house" and "building", as illustrated in FIG. 4b). The co-occurrence vector 412 for a first term indicates a pre-determined number of other terms which are most likely to co-occur in a data entity 213 along with the first term (along with an indication of the significance that the first term co-occurs with such other terms). As such, a plurality of co-occurrence vectors 412 may be determined for a corresponding plurality of terms, respectively. A co-occurrence vector 412 for the first term indicates a plurality of other terms which are most likely to occur with a data entity 213 along with the first term. Similarity measures (e.g. cosine similarity) may be used to determine a degree of similarity between pairs of co-occurrence vectors 412, thereby allowing to place the plurality of co-occurrence vectors 412 into a vector space. Subsequently, the plurality of co-occurrence vectors 412 may be clustered in the vector space, thereby providing one or more clusters 413 comprising one or more semantically similar terms (i.e. terms having co-occurrence vectors 412 which have a high degree of similarity). The clusters 413 may be arranged into a term-to-cluster mapping table 414, wherein the term-to-cluster mapping table 414 typically allows to map a term to exactly one cluster 413.

As indicated above, the term-to-cluster mapping table 414 may be stored on the electronic device 100 and may be used to implement a search scheme which takes into account semantic similarity. In particular, the term-to-cluster mapping table 414 may be used to determine semantic relevance vectors for the data entities 213 of the database 103, and/or to determined a semantic inverse index and/or to allow for a semantic search.

Figure 5A:
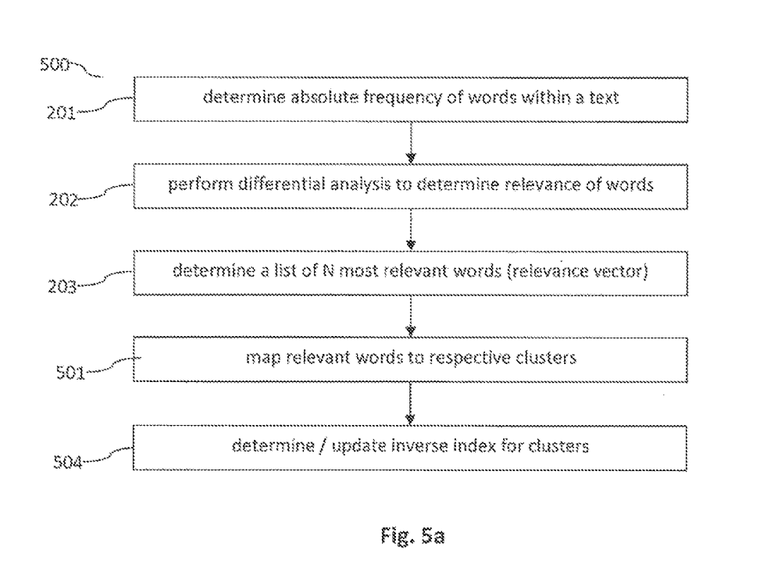
FIGS. 5a and 5b illustrate an example method for determining an inverse index for semantic clusters.

FIG. 5a illustrates a flow chart of an example method 500 for determining a semantic relevance vector for a data entity 213 and/or for determining a semantic inverse index. In a similar manner to the steps 201, 202, 203 of method 200, a relevance vector 216 comprising N terms (and their respective relevance values) may be determined for a data entity 213. Using the term-to-cluster mapping table 414, the N terms of the relevance vector 216 may be mapped to one or more respective clusters 413, wherein the number N' of clusters is smaller or equal to the number N of terms (step 501). The cluster relevance value for a first cluster may be determined based on the sum of the term relevance values of the terms of the relevance vector 216 which are mapped to the first cluster. As such, a semantic relevance vector may be determined, wherein the semantic relevance vector is indicative of N' clusters and their respective cluster relevance values. When only performing semantic searches, only the semantic relevance vectors may be stored as metadata along with the database 103 (instead of the relevance vectors 216 comprising the N terms), thereby further reducing the resource requirements.

Figure 5B:
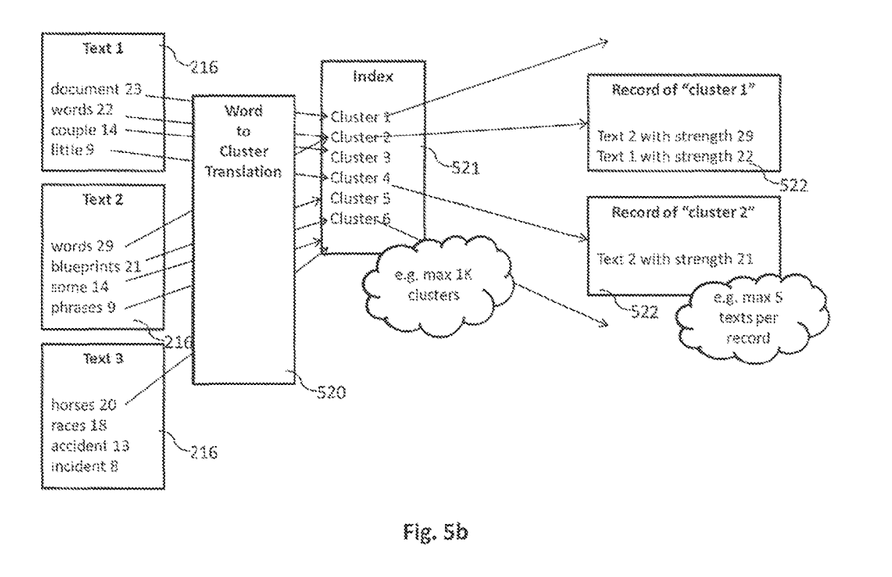

Furthermore, the method 500 may comprise the step 504 of determining or updating a semantic inverse index based on the cluster relevance vectors. The semantic inverse index may be determined in a similar manner to the inverse index 221, wherein the terms are replaced by the clusters 413. FIG. 5b provides further details regarding the determination and/or the update of a semantic inverse index 521. The relevance vectors 216 of the data entities 213 may be transformed into semantic relevance vectors using a term-to-cluster transformation 520 (which makes use of the term-to-cluster mapping table 414). The semantic inverse index 521 may comprise a record 522 for a plurality of L' cluster 413. Typically the number L' of cluster records 522 within a semantic inverse index 521 is (significantly) smaller than the number L of term records 222, thereby further reducing the resource requirements of the search scheme. By way of example, L' may be 1000 or less. In a similar manner to the term records 222, the cluster records 522 may indicate the P most relevant data entities 213 for the respective clusters listed in the semantic inverse index 521.

Figure 6:
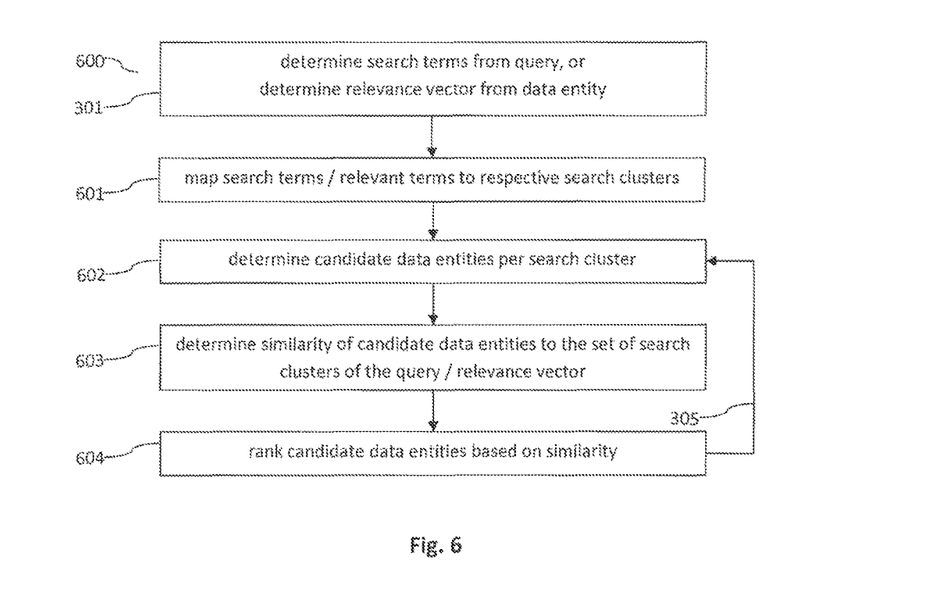
FIG. 6 shows a flow chart of an example method for determining candidate data entities in response to a query using semantic clusters.

The semantic inverse index 521 may be used to provide a search method 600 which is configured to take into account semantic similarities. The search method 600 is similar to the search method 300, wherein the search is performed based on clusters instead of terms. In view of the fact that the number of clusters is typically lower than the number of terms, the resource requirements for the cluster-based search method 600 are further reduced compared to the term-based search method 300. In a similar manner to the method 300, the M search terms of a query (or the N terms of the relevance vector 216 of a data entity 213) are determined (step 301). The M search terms are mapped to M' search clusters using the term-to-cluster mapping table 414, wherein M' is smaller than or equal to M (step 601). Subsequently, the candidate data entities 213 for an individual search cluster are determined using the semantic inverse index 521 (step 602 which corresponds to step 302 of method 300). The candidate data entities 213 are then compared to the complete query (step 603 which corresponds to step 303 of method 300). The comparison may make use of a similarity measure. As discussed in the context of method 300, the similarity measure may determine the degree of similarity (e.g. the cosine similarity) of the relevance vector 216 of the candidate data entity 213 and the query vector comprising the search terms of the query. In the case of method 600, the similarity measure may alternatively or in addition determine the degree of similarity (e.g. the cosine similarity) of the semantic relevance vector of the candidate data entity 213 and the semantic query vector comprising the search clusters of the query. Subsequently, the candidate data entities 213 may be ranked in accordance to their degrees of similarity to the complete query (step 604 which corresponds to step 304 of method 300). In a similar manner to method 300, the search method 600 may be performed in an iterative manner (step 305) for all the search clusters of the query.

In the present document, methods and systems for searching data entities from a database subject to a query have been described. The methods and systems have reduced memory and/or processing requirements compared to conventional search methods/systems, thereby allowing their use in the context of electronic devices having relatively low storage and/or processing capacities.

By way of example, the behavior of a conventional full inverse index compared to the heuristic inverse index (without the use of semantic clusters) has been investigated. Two different collections of emails, collection A with 3.000 emails, and collection B with 5.000 emails, have been used. Typically, the documents that a user stores in the database on his personal electronic device overlap significantly in their content. Hence, the actual amount of unique words (when ignoring very high-frequent words, as well as non-existing words, i.e. words that do not exist within a significantly larger background corpus) for collection A was found to be 3.863 words and in collection B 5.931 words. These words were found to be power-law distributed, as is typical for text collections. It was found that for collection A, a conventional inverse index had a total of 143.873 entries within the inverse index distributed among 3.863 word records, which requires at least 575 KB memory space to store if one assumes a 4-byte integer as storage unit. For collection B, the conventional index comprised 252.393 entries distributed among 5.931 word records requiring 1.001 KB of storage space. The heuristic inverse index described in the present document had only 4.814 entries distributed among 1371 word records requiring only 19 KB of storage space for collection A and 6.406 entries for 1.888 word records requiring 26 KB storage space for collection B. Furthermore, the comparison of the storage space requirements for collections A and B reveals that the growth of the storage space requirements of the heuristic inverse index (due to a growing number of text data entities within the database) may be lower than linear. In other words, the size of the heuristic inverse index grows less than proportionally to the size of the database. As such, the benefit of the heuristic inverse index increases with an increasing size of the database.

Since the heuristic inverse index described in the present document is not loss-less, the retrieval quality of the full inverse index and of the heuristic inverse index was measured and compared in terms of precision and recall combined to F-score, which is a widely adopted measure of quality of information retrieval systems. For collection A using the full inverse index resulted in an F-score of 24.99%, whereas the heuristic inverse index had an F-score of 30.11%. For collection B using the full inverse index resulted in an F-score of 25.07% and using the heuristic inverse index resulted in an F-score of 35.54%. The increase in quality (as opposed to an intuitively assumed decrease) may be attributed to the fact that by not even considering many documents when preparing the set of most similar documents to a search term, less confusion for the comparison method is produced, if the pre-selection of documents which are not to be considered works well. In other words, the performance increase results from the two-step approach of first selecting appropriate candidate text data entities (based on the individual search terms and based on the heuristic inverse index) and of subsequently determining the document similarity for the candidate text data entities only (based on the full query). Hence, the observed performance and quality increase relies on the performance of the differential analysis when selecting the most relevant words for each text data entity (i.e. when designing the heuristic inverse index).

In addition, the impact of using semantic clusters as described in this document has been measured. For collection A, the number of semantic class type records of the inverse index shrank to 499 with a total of 1.392 entries and a retrieval quality increase to an F-score of 32.98%. For collection B, the number of semantic class type records amounted to 556 with a total of 1.556 entries and a slight F-score decrease to 34.76%. The total required space for storing these further reduced semantic indexes was 5.5 KB for collection A and 6.2 KB for collection B. As such, it has been shown that the use of a semantic inverse index may further increase the quality of a search scheme which makes use of such a semantic inverse index, while at the same time further reducing the resource requirements.

The described methods and systems may be implemented on computer systems, such as server farms, servers, work stations, desktop PCs, virtualized desktops, laptops, tablet PCs, and handheld or wireless devices, such as mobile phones, smart phones, PDAs, etc. The described methods and systems are particularly relevant for a personal portable electronic device (such as a smartphone or a portable (tablet) PC) which comprises a database of text data entities (e.g. emails, sms, text documents) that are associated with the user of the personal portable electronic device.

The systems and methods described in the present document are not limited to the disclosed exemplary scenarios. Other use cases can benefit from the invention as well. This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art.

What is claimed is:

1. A method for determining an inverse index on an electronic device comprising a database, wherein the inverse index is configured to map a plurality of text data entities from the database to a search term, the method comprising
determining a plurality of relevance vectors for a plurality of text data entities from the database; wherein determining a relevance vector for a text data entity from the database comprises:
determining a plurality of occurrence rates of a plurality of terms within the text data entity;
determining a plurality of relevance values for the plurality of terms, based on the plurality of occurrence rates and based on a plurality of default occurrence rates for the plurality of terms;
selecting N terms from the plurality of terms having the highest relevance values; and
determining the relevance vector from the selected N terms and the respective relevance values;
mapping the terms of each of the plurality of relevance vectors to corresponding clusters, using a term-to-cluster mapping table, thereby yielding a plurality of semantic relevance vectors; wherein the term-to-cluster mapping table reflects a statistical co-occurrence of terms; wherein the term-to-cluster mapping table is configured to map terms having similar meaning to the same cluster; and
determining the inverse index comprising a plurality of records; wherein each of the plurality of records of the inverse index is associated with a respective cluster from the clusters indicated within the plurality of semantic relevance vectors; wherein
determining the inverse index comprises
for each of the plurality of records, selecting up to P text data entities from the database; wherein the semantic relevance vectors of the up to P text data entities of each of the plurality of records comprise the cluster that the record is associated with.

2. The method of claim 1, wherein
each of the plurality of records is further indicative of the relevance values of each of the up to P text data entities for the term that the record is associated with; and
the relevance value of a text data entity for a term corresponds to the relevance value of the term within the relevance vector of the text data entity.

3. The method of claim 1, wherein a first record for a first term comprises the up to P text data entities for which the corresponding up to P relevance vectors comprise the up to P highest relevance values for the first term among the plurality of relevance vectors.

4. The method of claim 1, wherein N is an integer smaller than or equal to 20; and/or wherein P is an integer smaller than or equal to 5.

5. A method for determining on an electronic device comprising a database a similar text data entity from the database; wherein the similar text data entity is similar to a search vector comprising a plurality of search terms; the method comprising
determining a plurality of first candidate text data entities based on a first of the plurality of search terms without considering the others of the plurality of search terms, using an inverse index designed in accordance to the method of claim 1;

determining a degree of similarity between each of the plurality of first candidate text data entities and the search vector, by taking into account at least one of the plurality of search terms other than the first search term; and determining the similar candidate text data entity based on the plurality of first candidate text data entities and the respective degrees of similarity;

mapping the search terms of the plurality of search terms to corresponding clusters, using a term-to-cluster mapping table, thereby yielding a semantic search vector comprising a plurality of search clusters; wherein the term-to-cluster mapping table reflects a statistical co-occurrence of terms;

the term-to-cluster mapping table is configured to map terms having similar meaning to the same cluster;

the plurality of first candidate text data entities are determined based on a first of the plurality of search clusters individually; and a degree of similarity between each of the plurality of first candidate text data entities and the semantic search vector is determined by taking into account at least one of the plurality of search clusters other than the first search cluster.

6. The method of claim 5, wherein the search vector is one of: a query comprising the plurality of search terms; a relevance vector of a text data entity, wherein the plurality of search terms corresponds to the N most relevant terms within the text data entity.

7. The method of claim 5, further comprising determining a plurality of candidate text data entities for each of the plurality of search terms, respectively;

for each of the plurality of search terms, determining a degree of similarity between each of the respective plurality of candidate text data entities and the search vector; and determining the similar candidate text data entity based on the plurality of candidate text data entities for each of the plurality of search terms and the respective degrees of similarity.

8. The method of claim 7, wherein the plurality of candidate text data entities, the respective degrees of similarity and the similar candidate text data entity are determined iteratively starting with the first search term and one-by-one progressing with the others of the plurality of search terms, until the plurality of candidate text data entities has been determined for each of the plurality of search terms.

9. An electronic device comprising a database which comprises a plurality of text data entities, wherein the electronic device comprises a processor which is configured to determine a plurality of relevance vectors for the plurality of text data entities from the database; wherein determining a relevance vector for a text data entity from the database comprises:

determining, at the processor, a plurality of occurrence rates of a plurality of terms within the text data entity;

determining, at the processor, a plurality of relevance values for the plurality of terms, based on the plurality of occurrence rates and based on a plurality of default occurrence rates for the plurality of terms;

selecting, at the processor, the N terms from the plurality of terms having the highest relevance values; and determining, at the processor, the relevance vector from the selected N terms and the respective relevance values;

map, at the processor, the terms of each of the plurality of relevance vectors to corresponding clusters, using a term-to-cluster mapping table, thereby yielding a plurality of semantic relevance vectors; wherein the term-to-cluster mapping table reflects a statistical co-occurrence of terms; wherein the term-to-cluster mapping table is configured to map terms having similar meaning to the same cluster; and wherein each of the plurality of records of the inverse index is associated with a respective cluster from the clusters indicated within the plurality of semantic relevance vectors; wherein determining the inverse index comprises for each of the plurality of records, selecting up to P text data entities from the database; wherein the semantic relevance vectors of the up to P text data entities of each of the plurality of records comprise the cluster that the record is associated with.

10. The electronic device of claim 9, wherein the processor is further configured to determine a plurality of first candidate text data entities based on a first of a plurality of search terms without considering the others of the plurality of search terms, using the inverse index;

determine a degree of similarity between each of the plurality of first candidate text data entities and a search vector comprising the plurality of search terms, by taking into account at least one of the plurality of search terms other than the first search term; and determine a similar candidate text data entity based on the plurality of first candidate text data entities and the respective degrees of similarity.

* * * * *